(12) United States Patent
Schuessler et al.

(10) Patent No.: US 6,732,932 B2
(45) Date of Patent: May 11, 2004

(54) BAR CODE SYMBOLOGY WITH INTEGRATED USER-INTERFACE GRAPHIC PATTERN

(75) Inventors: Frederick Schuessler, Baiting Hollow, NY (US); Alistair R. Hamilton, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 22 days.

(21) Appl. No.: 09/966,254

(22) Filed: Sep. 28, 2001

(65) Prior Publication Data

US 2002/0125330 A1 Sep. 12, 2002

Related U.S. Application Data

(60) Provisional application No. 60/239,678, filed on Oct. 12, 2000.

(51) Int. Cl.$^7$ .............................................. G02B 26/10
(52) U.S. Cl. .......................... 235/462.25; 235/462.07; 235/462.15
(58) Field of Search ................... 235/462.03, 462.07, 235/462.16, 494, 462.15, 462.25

(56) References Cited

U.S. PATENT DOCUMENTS

| | | | | | |
|---|---|---|---|---|---|
| 4,450,349 | A | * | 5/1984 | Apitz et al. | 235/462.18 |
| 5,262,625 | A | * | 11/1993 | Tom et al. | 235/462.07 |
| 5,479,515 | A | * | 12/1995 | Longacre, Jr. | 380/54 |
| 5,619,027 | A | * | 4/1997 | Ackley | 235/462.01 |
| 5,939,700 | A | * | 8/1999 | Ackley | 235/462.01 |
| 6,021,950 | A | * | 2/2000 | Hilmersson | 235/494 |
| 6,293,466 | B1 | * | 9/2001 | Fujita et al. | 235/462.02 |
| 6,302,330 | B1 | * | 10/2001 | Hilmersson | 235/494 |
| 6,412,695 | B1 | * | 7/2002 | Reber et al. | 235/462.07 |
| 6,550,685 | B1 | * | 4/2003 | Kindberg | 235/494 |

* cited by examiner

Primary Examiner—Diane I. Lee
Assistant Examiner—Kumiko C. Koyama
(74) Attorney, Agent, or Firm—Kirschstein, et al.

(57) ABSTRACT

A bar code symbology comprises a set of symbols having characters and patterns of bars and spaces. Each character spans a distance of m module widths and is represented by n bars and p interleaved spaces. The largest single bar or space is limited to k modules in width. A human recognizable graphic element is included among the patterns of bars and spaces. At least a portion of the graphic element is machine readable and recognizable by a decoder as a portion of the symbol.

16 Claims, 8 Drawing Sheets

BAR CODE SYMBOLOGY WITH INTEGRATED USER-INTERFACE GRAPHIC PATTERN

REFERENCE TO RELATED APPLICATIONS

This application claims the benefit of provisional application Ser. No. 60/239,678 filed Oct. 12, 2000.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the U.S. Patent and Trademark Office patent file or records, but otherwise reserves all other rights whatsoever.

BACKGROUND OF THE INVENTION

1. Field of the Invention

The invention relates to bar code reading and in particular to a new bar code or symbol with structure and features that make it particularly suitable for consumer-scanning applications. Its features include a user-recognizable graphic pattern located within the symbol, at least a portion of which is machine read able and recognizable by a symbol decoder.

2. Background of the Invention

Bar code symbols are formed from bars and spaces, such elements being typically rectangular in shape with a variety of possible widths. The specific arrangement of elements defines characters represented according to a set of rules and definitions specified by the code or "symbology" used. The relative size of the bars and spaces is determined by the type of coding used, as is the actual size of the bars and spaces. The number of characters (represented by the bar code symbol) is referred to as the density of the symbol. To encode a desired sequence of the characters, a collection of element arrangements is concatenated together to form a complete bar code symbol, with each character of the symbol being represented by its own corresponding group of elements. In some symbologies, a unique "start" and "stop" character is used to indicate when the bar code begins and ends. A number of different bar code symbologies is in widespread use, including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a one-dimensional symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but of a matrix array made up of hexagonal, square, polygonal and/or other geometric shapes, lines, or dots. Such symbols are described in, for example, U.S. Pat. Nos. 5,2276,315 and 4,794,239. Such matrix code symbologies may include Vericode, Datacode, and MAXICODE.

Ever since the advent of the Universal Product Code in the 1970's, linear bar code symbols have been widely adopted as an inexpensive but effective way of automating the link between printed numbers on paper and computer databases. Several bar code "languages," called "symbologies" have been developed, each with its advantages for certain applications. Because bar codes are so common in our daily environment, and used in so many different applications, it is often important that a symbology, or a distinct variant of a symbology, be reserved for one specific application. For example, a bar code scanning system may read a bar code encoding a string of digits such as "12345678905". It is very important that the system can unequivocally determine that this string is to be used to look up the price of a grocery item, and that the price can be found, using the decoded string of digits as a key, in a database of numbers assigned by the Uniform Code Council for this purpose. In the past, many other symbologies and symbology variants have also been reserved for such specific uses, such as a Code 128 symbol for marking medical instruments, a 14-digit Interleaved Two-of-Five symbol for marking cases for logistics tracking, and a 6-digit Code 39 symbol for marking telecommunications equipment.

One aspect held in common by all of the above traditional bar code applications, is that a worker (such as a checkout clerk at a supermarket) will be trained and paid to scan the specific kind of bar code required by the application. Recently, however, as the cost of computers, and of scanning hardware, has decreased, a new set of consumer-scanning applications has become feasible.

Consumer scanning applications will, in principle, have many requirements in common with traditional bar code applications, except that the consumer-scanning application will increase the difficulty of meeting some of these requirements. In addition, consumer scanning places some new requirements on the symbology.

Just like in traditional applications, the consumer scanning system needs the ability to distinguish bar codes for the intended application from all other bar code types. A new requirement, however, is that the consumer-as-scanner-operator needs, without training, to be able to visually distinguish the consumer bar code from the other bar codes in the environment. Also, the consumer must realize, at a glance and almost instinctively, that scanning a bar code with a certain graphical "message" will cause a specific action that is desired by the consumer. For example, a consumer bar code may have the purpose of linking a print advertisement to a specific page on the World Wide Web. The consumer bar code must be easily recognized as a bar code that will, in this example, launch a web browser program. In other words, the ideal consumer-oriented bar code must serve not only a paper-to-machine interface, but also as a graphical user interface (GUI) to the associated consumer application.

An Interface Graphic, although highly desirable in helping consumers identify the proper bar code to scan, will inevitably require some additional space (compared to a similar bar code without any Interface Graphic). Advertisers may be tempted to print the bar code minus the graphic, so that the bar code takes up less space within the advertisement. However, this will reduce consumer recognition, and reduce the overall effectiveness of the system. Thus, the ideal consumer scanning symbology would incorporate its Interface Graphic as an integral portion of the scannable symbol. In this way, the overall size of the symbol-plus-graphic can be reduced, and further, removal of the interface graphic would disable the symbol entirely (thus negating any motivation to remove it). Furthermore, it is desirable for the Interface Graphic itself to be usable in other contexts than the bar code (for example, in a corporate logo) to help reinforce the consumer's association between the bar code and the program (web browser, etc.) for which the bar code serves as input. Thus, a preferred embodiment of the Interface Graphic would contain "scannable" elements, yet can also stand on its own as a graphic design.

A consumer scanning system often lacks the checks-and-balances that, in business bar coding systems, help enforce good print quality. In a business system such as retail checkout in a supermarket, or such as a shipping/receiving application, badly printed symbols impact the supermarket or receiving company as a measurable loss of productivity. As a result, it is common for business to automatically capture statistics on bar code performance, and to enforce sanctions on suppliers who do not print acceptable bar codes. In contrast, performance of consumer bar codes will not be tracked, and it is expected that they will not always be printed according to specification. One of the most common violations of bar code specifications is to reduce the required white space surrounding a bar code, in order to save space on the paper. Thus the ideal consumer scanning symbology will work with minimal amounts of white space surrounding the bar code, and preferably, the overall design of the bar code (including its Interface Graphic) will help protect the required white space from encroaching text or other graphics.

Many traditional bar code applications need to fit the printed symbols in a relatively small area. Consumer scanning applications increase the importance of this requirement, as the bar codes will need to fit in constrained spaces such as to mark line items in catalogue tables, and to fit within a single line of text in a newspaper article. Thus, the ideal consumer scanning symbology needs to minimize both the height and the length of the printed bar code, while still incorporating a distinctive GUI.

One prior art symbology, the "CueCode" bar code, sponsored by Digital Convergence, is an example of a new symbology (a variant of Code 128) for consumer applications that has been given a non-traditional appearance. In this case, the CueCode is always accompanied by a Digital Convergence trademark (the letter 'C' preceded by a colon), and moreover, the bars of this bar code are always printed at a 22.5 degree slant, to help visually distinguish these symbols from other bar codes. However, these attempts to visually distinguish the CueCode have resulted in a bar code that is significantly wider than a standard Code 128 symbol encoding the same amount of data. The ideal consumer scanning symbology will provide a readily recognizable GUI, without a significant increase in size. Moreover, the techniques used by Digital Convergence for making the bar code visually distinctive are, in no way, integral to the design or scanning of the symbology. If one were to straighten up the bars, and totally remove the trademark, this would have no negative impact on the scanner's ability to read the symbol. In fact, the opposite is true: straightening out the bars would improve scannability, and the trademark is usually printed in red ink so as to make it as invisible to the scanner as possible. Ideally, the GUI element of the consumer bar code should be an integral part of the symbology, such that removing the GUI would disable the scanner (not improve its performance).

One more aspect of CueCodes should also be noted. Two triangles are printed on the left and right sides of each CueCode. These triangles are placed so as to create 10X-wide white spaces (forming the required "quiet zones" or "margins" specified for Code 128). These are somewhat similar in appearance to a technique of the present invention called a "protected margin". However, the triangles are not part of the logo or Interface Graphic portion of the CueCode, as is the "protected margin" of the present invention. These triangular features of a CueCode might also be mistaken for a second technique of this invention, called a "captured margin." CueCode's triangles do not perform this function, however, for three reasons:

1) scans near the thin end of the triangle may not resolve the narrow tip of it (which becomes less than 1X wide), and thus not all scans will "see" a captured margin;

2) any scan that is not perfectly parallel to the long dimension of the CueCode, if near the top or bottom of the symbol, will miss at least one of the two triangles completely, and thus not all scans will "see" a captured margin; and 3) in decoding a CueCode (or in decoding standard Code 128), an exact width for the margins is not required (and, in fact, CueCodes can be scanned successfully even if the triangles are removed).

Another example in the prior art is Supercode, which is a two-dimensional bar code that can be laid out in non-rectangular shapes. Thus, it is possible to lay out a Supercode symbol in a way that suggests a graphic image. However, not only does this layout greatly reduce the spatial efficiency of the symbol (compared to a simple rectangular layout), but the resulting graphic still looks like a bar code (because it is, in fact, a bar code), and thus this format is not appropriate for corporate logos and other uses.

SUMMARY OF THE INVENTION

1. Oobjects of the Invention

It is a general object of the present invention to provide an improved bar code symbology incorporating a user recognizable graphic pattern.

It is another object of the invention to provide a bar code reader capable of reading the improved symbology.

It is a further object of the present invention to provide a printer for printing the improved symbology.

It is a still further object of the present invention to provide software capable of decoding the improved symbology.

It is an even further object of the invention to provide a method which can be used to accomplish one or more of the above objects.

It is an object of the present invention to provide a machine-readable symbology, in which consumer-friendly text and graphics may be printed in direct contact with the leftmost and rightmost bars of the symbol, and may even coincide with these leftmost and rightmost bars.

It is still another object of the present invention to provide a variable-length linear symbology that does not require large white spaces at either end of the bar code, and yet resists short-reads without needing to explicitly encode the length of the symbol.

It is an object of the present invention to provide a machine-readable symbology that includes a space-efficient "finder" pattern, which facilitates a rapid search through text and graphics without the need to perform arithmetic upon sums of multiple bars and spaces.

It is a goal of the present invention to provide a machine-readable symbology, in which consumer-friendly text and graphics are printed in direct association with the bars and spaces of the symbol, and may even coincide with some of these bars and spaces.

It is a goal of the present invention to provide a machine-readable symbology, which incorporates an Interface Graphic element designed for easy human recognition, where the Interface Graphic cannot be removed without disabling the symbology.

It is a goal of the present invention to provide a machine-readable symbology, which incorporates an Interface Graphic element designed for easy human recognition, and that conserves space by combining elements of the bar code with elements of the Interface Graphic.

It is a goal of the present invention to provide a machine-readable symbology, which incorporates an Interface Graphic element designed for easy human recognition, and that can use measurements that span both vertical and non-vertical edges as part of recognition patterns.

It is a goal of the present invention to provide a machine-readable symbology, which incorporates an Interface Graphic element designed for easy human recognition, where the Interface Graphic helps define and protect the required white space ("margins") around the symbol.

It is a goal of the present invention to provide a machine-readable symbology, which incorporates an Interface Graphic element designed for easy human recognition, where the Interface Graphic extends above and below the bars of the symbol, in order to define a taller image rectangle that protects the required white space ("margins") above and below the symbol.

It is a goal of the present invention to provide a machine-readable symbology, which incorporates an Interface Graphic element designed for easy human recognition, where all or part of the Interface Graphic also serves as a "finder pattern" for the symbol.

It is a goal of the present invention to provide a machine-readable symbology, which incorporates an Interface Graphic element designed for easy human recognition, where all or part of the Interface Graphic also serves as all or part of a "start pattern" for the symbol.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Summary of the Invention

The present invention provides a bar code symbology comprising symbols including characters having patterns of bars and spaces. Each character spans a distance of m module widths and is represented by n bars and p interleaved spaces. The largest single bar or space is limited to k modules in width. Each symbol has a predetermined start pattern, a predetermined stop pattern, and a human recognizable graphic element provided among the patterns of bars and spaces. At least a portion of the graphic element is machine readable and recognizable by a decoder as a portion of a respective symbol.

The present invention further provides an information-bearing machine-readable carrier including a substrate; and a symbol including characters having a pattern of bars and spaces on the substrate in which each character spans a distance of m module widths and is represented by n bars and p interleaved spaces. The largest single bar or space in a character is limited to k modules in width. The symbol has a predetermined start pattern, a predetermined stop pattern, and a human recognizable graphic element provided among the pattern of bars and spaces, with at least a portion of the graphic element being machine readable and recognizable by a decoder as a portion of the symbol.

The present invention further provides an imager or a scanner for obtaining data from a target in a field. The target includes a symbol including characters having a pattern of bars and spaces in which each character spans a distance of m module widths and is represented by n bars and p interleaved spaces. The largest single bar or space in a character is limited to k modules in width. The symbol has a predetermined start pattern and a human recognizable graphic element provided among the pattern of bars and spaces, with at least a portion of the graphic element being machine readable and recognizable by a decoder as a portion of the symbol. The decoder is operative for processing image data to derive information contained in the symbol.

The novel features and characteristics of the invention are set forth in the appended claims. The invention itself, however, as well as other features and advantages thereof, will be best understood by reference to a detailed description of specific embodiments, when read in conjunction with the accompanying drawings.

BRIEF DESCRIPTIONS OF THE DRAWINGS

DETAILED DESCRIPTION OF THE PREFERRED EMBODIMENTS

Figure 1:
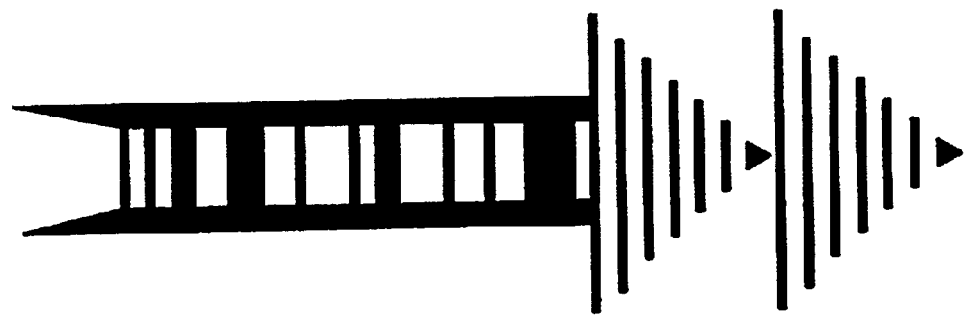
FIG. 1 is a first embodiment of a bar code symbology with an integrated graphic pattern according to the present invention.

Every linear symbology uses sets of predefined bar/space patterns to encode information. The present invention uses a set of patterns with several characteristics in common to each pattern (called a "symbol character"). Each symbol character of the preferred embodiment consists of 3 bars and 3 interleaved spaces, and spans a total of 11 unit widths (or modules). The largest single bar or space in a pattern is limited to 4 modules in width and, as a parity check to catch printing or scanning errors, the sum of the three bars of a pattern is always an even number. In the terminology commonly used in the literature, this may, therefore, be described as an (11,3,4,E) symbology. Code 128 uses all 108 possible patterns from the set of (11,3,4,E) patterns, whereas in the preferred embodiment, the present invention selects just 100 of these patterns to encode data, and 3 more that may only be used in the check-character position. The remaining (11,3,4,E) patterns are excluded in order to guarantee that, in the preferred embodiment, the defined start pattern at the left end of the symbol, and the defined stop pattern at the right end of the symbol, cannot also appear at any other point within the symbol.

Most linear symbologies known in the art rely on two large white spaces (called "quiet zones" or "margins") to delineate the start and stop of the symbol or bar code. These spaces are usually about the width of a data character (each nominally 10X wide). Since these large spaces are much larger than the maximum space element allowed for the symbology, they help ensure that a false start or stop pattern within the bar code cannot result in a missed decode or short read. Thus, for traditional symbologies, it is not important that the start and stop patterns be unique at off-boundary locations within the symbol.

The first step in designing a symbology in accordance with the present invention is to select an interface Graphic that conveys an appropriate visual message to the consumer (when incorporated into the bar code), and that preferably is also appropriate as a corporate logo. In this disclosure, a double-arrow design reminiscent of a fast-forward button on a video cassette recorder (VCR) is used as the starting point for most of the preferred embodiments, but any other simple but strong graphic, including one with curved lines, could also be the starting point.

The next step is to select a character set with a sufficient number of distinct and reliably decodable patterns to meet the requirements of the application. In the preferred embodiment, a (11,3,4,E) symbology was selected as the starting point, because it has a sufficient number of patterns (108) to encode pairs of digits efficiently. In this particular case, only 100 combinations are required to encode all the possible digit pairs.

Finally, a strategy must be chosen for making the Interface Graphic an integral part of the bar code symbology. Several different techniques for accomplishing this are disclosed. These techniques can often be combined; the choice of technique(s) is largely determined by the aesthetic considerations of the desired graphical interface, but other factors can also be considered (such as a desire to minimize the height and/or width of the resulting bar code, or to minimize processing time when finding the symbol in graphics, or to minimize the risk of short reads due to poorly-aligned scans). To minimize the size of the printed bar codes, the preferred embodiments re-use all or part of the Interface Graphic to also serve as all or part of the start or stop pattern of the symbology.

Depending upon how these factors are valued relative to each other, different solutions may be the preferred embodiment for different applications. Thus, the present invention encompasses several distinct preferred embodiments, which utilize different techniques for turning a graphical element into a decodable element.

The following novel techniques are used, either alone or in combination, in the embodiments disclosed herein:

1. Protected margin: in this technique, some graphical element of the Interface Graphic also serves to delineate a "keep-out area" of white space (where the white space serves an algorithmic purpose). Thus, a portion of the Interface Graphic serves both an aesthetic purpose, and a practical purpose (preventing text and extraneous graphics from encroaching on necessary white space). This technique differs from what is known in the art, where it is not uncommon, for example, to simply place a border around the symbol in order to protect its quiet zones. The protected margin of the present invention is unique for two reasons:

the protection comes from a recognizable and integrated graphical element, rather than from an extraneous border or other element which is not used by the decode algorithm, and in some of the embodiments of the invention, the Interface Graphic protects a required margin above and below the symbol, as well as to the left or right of it. In some embodiments, this feature provides strengthened short-read protection (against scans that enter or exit the symbol along the top or bottom rather than at the sides, as intended).

This feature can therefore be used to maintain high security while permitting a shorter start or stop pattern than would otherwise be required.

2. Captured margin: has the same characteristics as the Protected margin, but improves upon it because it both protects and delineates the white space. The resulting white space may be at a constant fixed width. Alternatively, if adjacent to a slanted dark element, the white space will be specified between a minimum and maximum width, with a fixed-width measurement across the pair of elements (from the vertical edge of the white space, across the slanted black/white boundary, to the far vertical edge of the adjacent black). Either way, the Captured margin serves as a much stronger recognition feature than a white space that is protected but that can be arbitrarily large.

3. Shaped finder: a fixed-width pattern of bars and spaces, but that varies in height to convey a "striped" graphical image. Preferably, the fixed finder pattern is uniform (to minimize visual distraction, and so as not to convey a "bar code-like" impression).

4. Parallel non-vertical edges: using fixed ratios of bar/space combinations (i.e., of vertical edges) is well known in the art. The present invention is the first bar code usage of parallel non-vertical edges (e.g., the slanted lines formed by an adjacent pair of arrows) in combination with vertical edges, to form decodable ratios.

5. Shared vertical elements: one or more vertical edges of the Interface Graphic also serve double-duty as "decodable" bars and/or spaces. Also, an exact and fixed distance between the Interface Graphic and a bar of the symbol also can serve as a white shared vertical element.

6. Controlled optional graphics: incorporating and using graphical elements, within the interior of the Interface Graphic, that may or may not be scanned (either because they do not extend the full height of the symbol, or because they may be printed in red or some other color that "looks" white to the scanner. This technique is utilized to ensure that the Interface Graphic enforces the "directionality" of the adjacent bar code pattern: the optional elements, if printed in black and if scanned by the operator, are designed so that they cannot appear to be part of a valid symbol scanned in the opposite direction.

FIG. 1 shows a sample of one preferred embodiment of the disclosed invention, showing two of the disclosed techniques. The symbol of FIG. 1 has a "Protected margin" on the left, and a "Shaped finder" on the right.

Working from left to right, this embodiment consists of the following:

1. A standard minimum-10X left quiet zone, "protected" by the arrow's tail from encroachment by surrounding graphics.
2. A 1X bar, followed by a 1X space (which replaces the 11X-wide Code 128 Start C pattern).
   This pattern is present to accomplish the following:
   provide some fixed pattern next to the margin, to make it easier for the decoder to find the margin and reject some false candidates, and
   ensure that first-bar growth does not distort the following data character.
3. Two standard Code 128 data characters, representing "1234" in Code Set C.
4. A standard Code 128 Modulo-103 check character (although its calculated value will not include the "phantom" Start C character).
5. A "Shaped finder", in this case, shaped as an arrowhead pattern, which starts with 10 1X elements in succession (5 bars and 5 spaces). This pattern, while visually comprising the left half of an Interface Graphic (in this case, a double-arrow pattern), is actually the "finder" for the bar code, and replaces both the Code 128 stop character and the right quiet zone. This pattern is to be preferred, compared to simply using the Code 128 stop pattern in the arrowhead, for several reasons:
   Technically, it is a much "stronger" pattern, especially when not followed by a trailing margin, than the stop pattern would be. Unlike a Code 128 stop character, a series of 10 narrow elements cannot be found at any position within a normal Code 128 symbol.
   It can be found using a fast and simple algorithm, because it is about twice the density of a Code 128 character; the character-to-character length checks can easily detect it.
   Visually, the evenness of the pattern, and the fact that the pattern is a different density from the bar code, makes the arrowhead look like it is not part of the bar code, thus making the "ugly" data-carrying portion of the design appear even smaller than it really is.
6. A second arrowhead, identical to the first, which serves no symbology purpose—it is there purely to strengthen the visual recognizability of the Interface Graphic (and, in this particular example, it completes the standard "fast-forward" symbol).
7. In addition to all the elements made up of vertical bars, there are horizontal lines above and below the data-carrying portion of the symbol. These lines serve to strengthen the overall impression of an "arrow" shape, but they also prevent short-reads if the symbol is accidentally scanned at too much of an angle. This embodiment requires such vertical lines, because the simple one-bar/one-space pattern at the left of the symbol can be found at other locations within the bar code. A scan that accidentally enters the symbol at such a misaligned location could appear to have been a properly aligned scan entering a shorter symbol, thereby resulting in a short-read.

Figure 2:
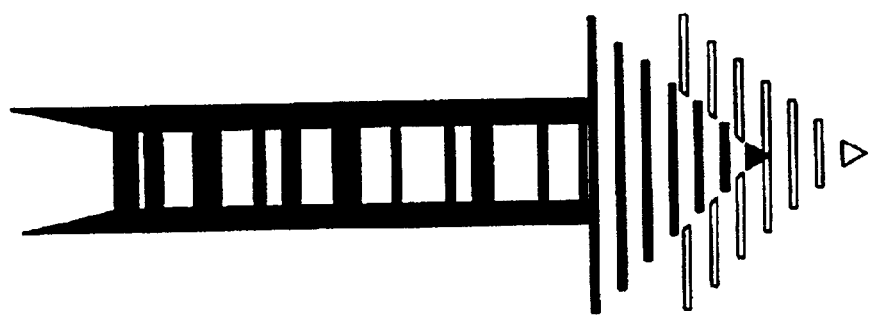
FIG. 2 is a second embodiment of a bar code symbology with an integrated graphic pattern according to the present invention.

FIG. 2 shows a variant of the same embodiment as in FIG. 1, but where the non-essential portion of the Interface Graphic has been visually "slid behind" the scannable portion of the finder, in order to save space.

Figure 3:
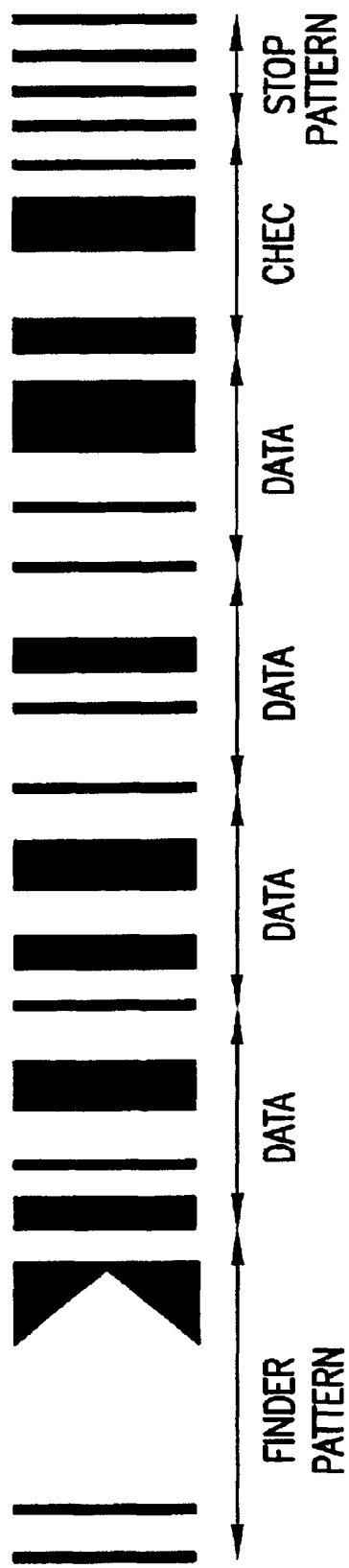
FIG. 3 is a third embodiment of a bar code symbology with an integrated graphic pattern according to the present invention.

FIG. 3 shows a different preferred embodiment. This embodiment strives to minimize the vertical space required for the consumer bar code, by reducing the Interface Graphic to a single white-on-black arrowhead (which gives the impression of extending above and below the symbol, without taking up any space). The white space (margin) on the left is an improved version of that in FIGS. 1 and 2, because it is a Captured margin, rather than a Protected margin. This is a stronger and more secure recognition (finder) feature, and eliminates the need for the horizontal bars in FIGS. 1 and 2. The stop pattern in FIG. 3 (on the right) is shorter than the finder of FIGS. 1 and 2, because the Captured margin serves as a finder. This stop pattern serves only to prevent short reads.

As shown in FIG. 3, the complete symbol contains the following elements, when scanned from left to right:

1. A 1X bar/1X space/1X bar guard pattern. No left quiet zone is required. The first bar can merge with graphics to the left of it, if desired.
2. A large space (which varies between 8X and 11X wide, depending on exactly where the scan line crosses it). This space is embedded within the overall bar code, and thus "protected" from surrounding graphics. It serves as a finder-margin (because it is immediately surrounded by 1X spaces, a standard margin search will find it), and also as part of the Interface Graphic.
3. Two stacked triangles merging with a 1X-wide vertical bar (which assures that any scan line will see at least a 1X-wide bar). This will appear to the scanner as a variable 1X to 5X wide bar, but the sum of this bar plus the adjacent wide space is always 13X. This is followed by a 1X space, separating the Interface Graphic and finder from the first data character.
4. A variable number of standard Code 128 data characters (each 3 bars and 3 spaces, 11 modules in total width). The minimum number of data characters is 2 (encoding 4 digits), and while there is no algorithmic need for a maximum number of characters, one character will be assigned to limit the required length of the scan line.
5. A standard Code 128 Modulo-103 check character (although its calculated value will not include the "phantom" start C character),
6. A terminating pattern of 7-1X elements in succession (3 bars and 3 spaces, terminated by a final bar which can be 1X or greater.). This pattern is approximately half as wide as a Code 128 stop pattern, yet is guaranteed to be unique within these bar codes. Therefore, this code can be of variable-length, without requiring horizontal bars or keep-out areas above and below the symbol.

No other quiet zones or white space is required. Text or graphics can be allowed to bleed into the symbol from any direction without affecting its decodability.

Figure 4:
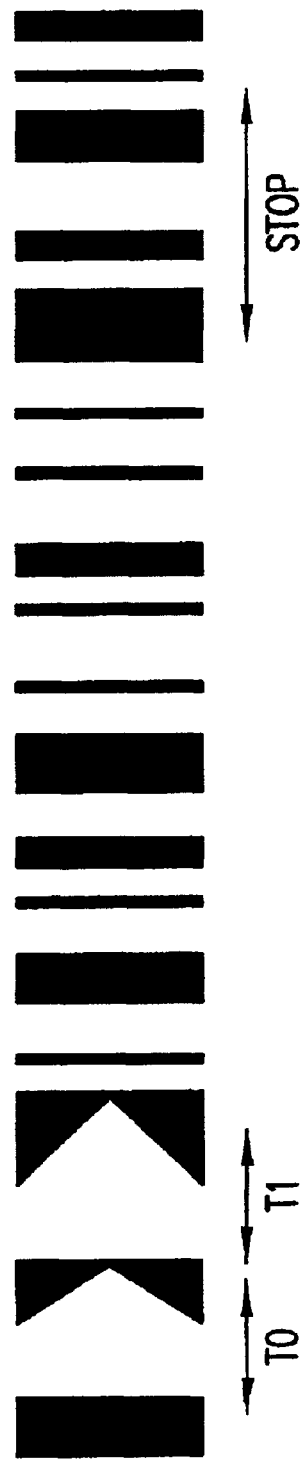
FIG. 4 is a forth embodiment of a bar code symbology with an integrated graphic pattern according to the present invention.

Another preferred embodiment is shown in FIG. 4. This embodiment uses a finder (the doubled white-on-black arrowheads on the left) that includes slanted lines. Note that, unlike FIG. 3 above, this embodiment does not use a Captured margin technique (the spaces of the arrowhead are not wide enough at the top and bottom to be unique finder elements by themselves). Instead, this embodiment uses a parallel non-vertical edge technique. A scan line may (depending on the operator's aim) be placed arbitrarily near the top or the bottom of the symbol, rather than straight through the central portion. Thus, the width of the first arrowhead space, for example, will be indeterminate. However, the combined width of the leftmost black triangle plus the second white arrowhead will be constant, regardless of where the operator aims. Also, the sum of the first arrowhead plus the first triangle is constant, and so on. Thus, there is a large number of invariant measurements and ratios that can be checked to verify that a finder has been scanned. As the first step in the search for this pattern, the decoder looks for a large ratio (9:2) between two adjacent black/white pairs (the large pair is shown as T1 in FIG. 4, and the narrow pair is immediately to its right). This is a valid distinguishing pattern within the consumer-scanning environment, because the other common bar code symbologies (such as Code 128 and EAN/UPC) never have adjacent pairs with a ratio greater than 7:2. Finding this 9:2 ratio, and confirming it as a 9:9:2 ratio (now including the other arrowhead, shown as T0) identifies that the Interface Graphic was scanned.

In FIG. 4, the stop pattern shown (on the right) is that of standard Code 128, which must be followed by a large white space in order to prevent short reads (or alternatively, horizontal black bars could be added above and below the bars to accomplish this). However, if instead the stop pattern of FIG. 3 were utilized, then neither horizontal bars, nor a large trailing white space would be required.

Figure 5:
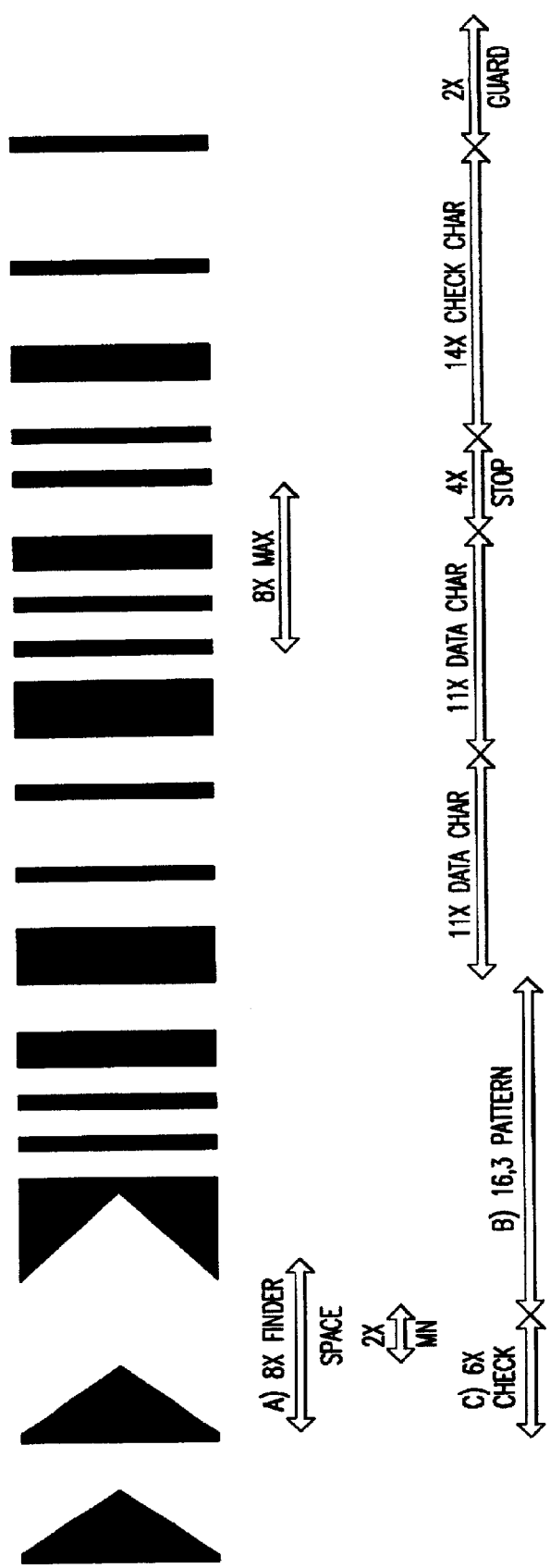
FIG. 5 is a fifth embodiment of a bar code symbology with an integrated graphic pattern according to the present invention.

FIG. 5 shows a preferred embodiment that combines two of the techniques disclosed above, in that it uses parallel non-vertical edges to create a fixed-width captured margin (the finder space is a constant 8X wide, regardless of where the scan line crosses it). In addition, the trailing edges of the two black arrowheads of the Interface Graphic form another invariant measurement (labeled T0).

Figure 6:
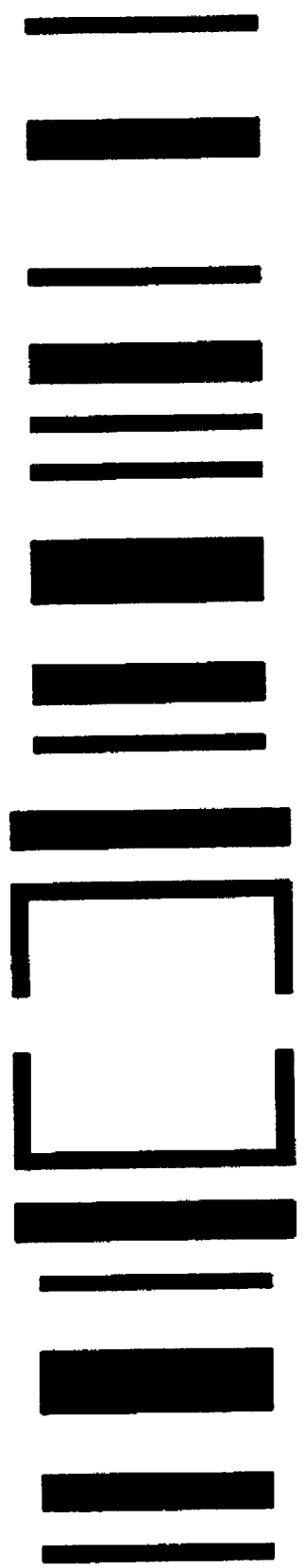
FIG. 6 is a sixth embodiment of a bar code symbology with an integrated graphic pattern according to the present invention.

FIG. 6 shows another preferred embodiment. The Interface Graphic of FIG. 6 incorporates a fixed-width captured margin as a finder. As indicated by this embodiment, an integrated Interface Graphic is not limited to use at the extreme left or right end of a bar code. Note that in this embodiment, the visually prominent elements are symmetrical (to be aesthetically pleasing).

Only the leftmost and rightmost spaces of the finder are asymmetric, in order to indicate scan direction when decoding. Another variant of this embodiment (not shown) replaces the taller elements of FIG. 6 with concentric arcs (to convey a perception of radio waves emanating from a protected margin). Also of note in FIG. 6 is that it subtly incorporates a second technique, in that (besides the prominent "captured" margin in the middle) the taller graphical elements serve to "protect" a 1X horizontal margin above and below the bars of the symbol. This serves to prevent short reads, much as did the horizontal black bands above and below the bar code in an earlier embodiment. In the case of FIG. 6, this 1X margin will appear to be an illegally large space when scanned at a shallow angle. This prevents a short scan from being combined with surrounding graphics to create a false stop pattern or an otherwise incorrect decode of the symbol.

Figure 7:
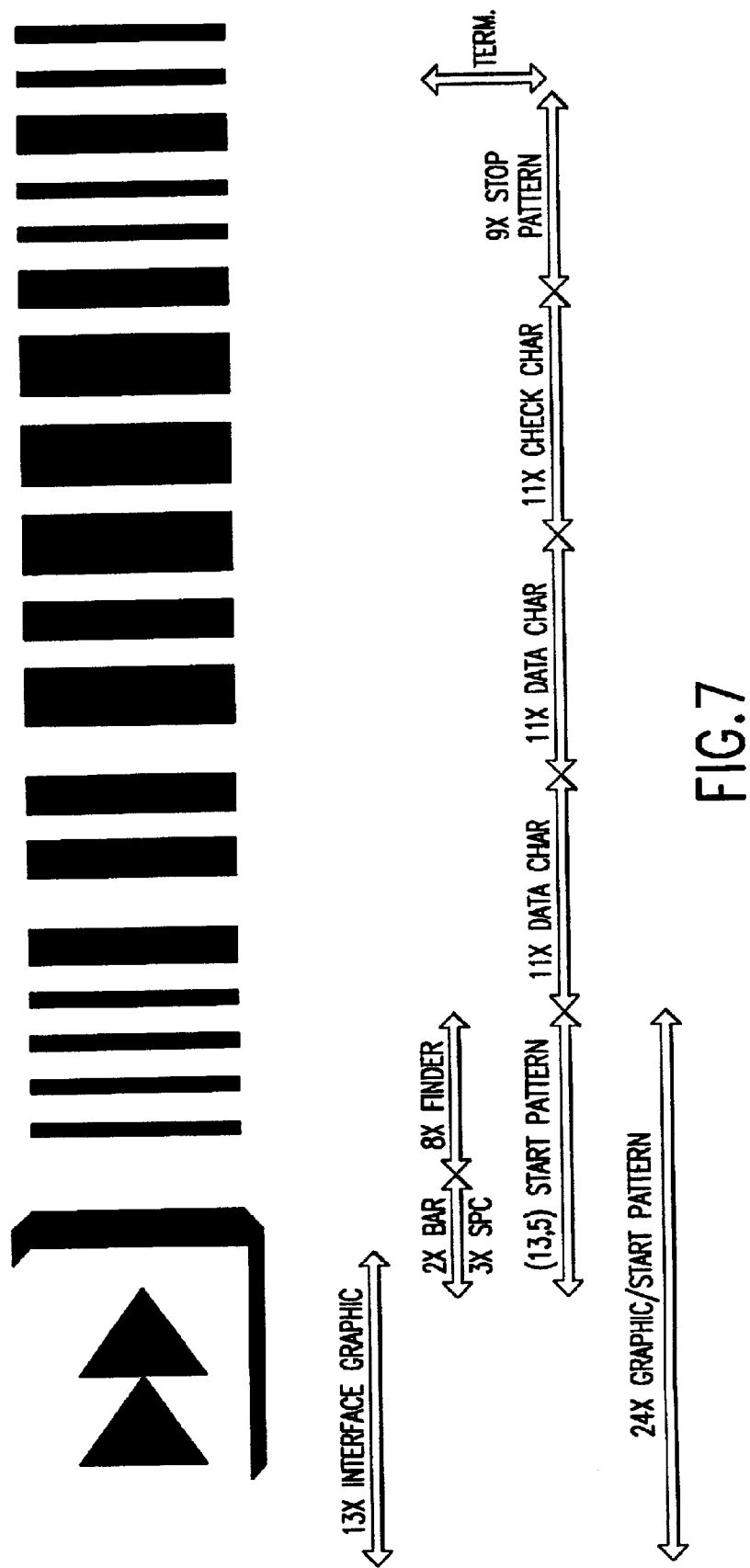
FIG. 7 is a seventh embodiment of a bar code symbology with an integrated graphic pattern according to the present invention.

FIG. 7 shows another preferred embodiment. The Interface Graphic of this embodiment represents a fast-forward button as seen on VCRs; and a stylized reverse-L suggests the shadow of a raised button. This Interface Graphic uses shared vertical elements: the vertical portion of the button's shadow is also a precisely 2X-wide bar of the start pattern, and the spacing between the button and the bars of the finder also forms a precisely 3X-wide space within the start pattern.

This Interface Graphic also provides controlled optional graphics, as follows. The arrowheads within the "button" may not be scanned by some scan lines, for either of two reasons: the arrowheads do not extend the full height of the bars of the symbol, and they may be printed in red (a color that appears as white to a scanner). Either way, this Interface Graphic design ensures that the decoder cannot misinterpret a forward scan of the finder pattern as a reverse scan, even if the first elements of the first data character mimic the wider elements of the start pattern. One of two conditions will always occur:

1. A given scan may not "see" the arrowheads (either because they were printed in red, or because the scan line was too high or too low). In this case, the "empty button" that the scanner sees provides a protected 11X white space, which cannot be mistakenly interpreted as the body of the symbol (from a reverse scan). Or,
2. A given scan may "see" the arrowhead. Even in this case, the left (vertical) edge of the right arrowhead has been placed in a position that ensures that a valid data character, adjacent to the finder pattern (mistakenly misinterpreted as a reverse scan) cannot accidentally appear within the Interface Graphic.

This Interface Graphic (because the "shadow" extends 1X above and below the body of the symbol) also provides a Protected margin for the required 1X quiet zones above and below the bars of the body of the symbol, to help prevent short reads. Although the extended vertical element on the left does not literally prevent graphics from encroaching at the right end of the symbol, this protection tends to work almost all of the time, because the graphic image of a bar code is almost always generated as a single rectangle (not a more complex shape). The generated rectangular image has to be tall enough to hold the extended vertical element, and so a 1X margin above and below the bars will be created by default.

Another characteristic to note: The finder pattern (8 narrow elements) is positioned nearest the Interface Graphic, rather than at the other end, so as to minimize visual distraction and to ease the visual transition from the fixed Interface Graphic to the variable patterns that convey data.

The embodiment of FIG. 7 comprises the following elements, if scanned left to right:
a) A graphic/start pattern, consisting of:
an Interface Graphic element, as shown in FIG. 1, ending in a 2-module-wide bar (preceded by a space that shall be 2X wide or wider);
a 3-module space; and
an 8-module finder pattern. The start pattern is composed of this finder pattern, plus the preceding 2-module bar and 3-module space;
b) between 2 and 7 Code 128 symbol characters, each representing two digits;
c) a modulo 103 symbol check character;
d) a stop pattern consisting of 8 elements, for a total of 9 modules; and
e) a terminating bar (1 to 4 modules wide), followed by a minimum 1X space.

The accompanying draft symbology specification corresponds to one preferred embodiment of this invention, that shown in FIG. 7. It contains a table (Table 1) showing all of the patterns used to encode data according to the preferred embodiment. The draft also contains figures showing the start and stop patterns of the preferred embodiment, and a description of the Interface Graphic shown in FIG. 7.

Figure 8:
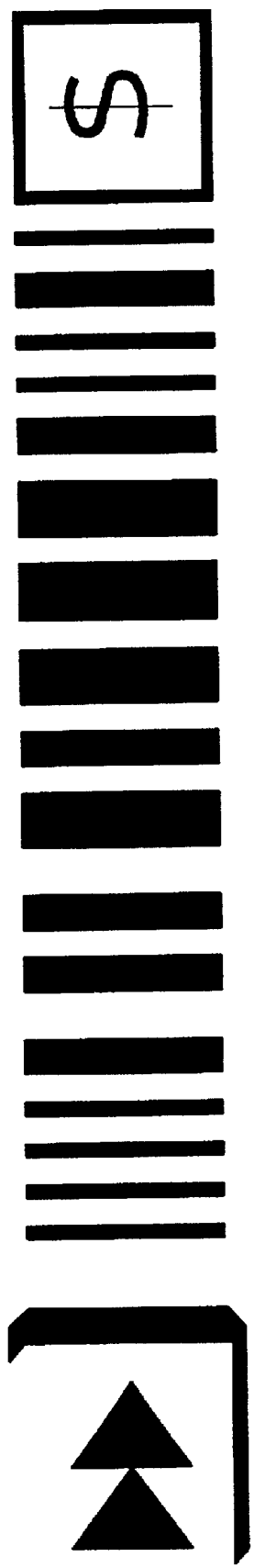
FIG. 8 is an eighth embodiment of a bar code symbology with an integrated graphic pattern according to the present invention.

FIG. 8 shows the same embodiment as FIG. 7, but with user Interface Graphics at both ends of the symbol.

In FIG. 8, two shared vertical elements are present: on the left, the same element as shown in FIG. 7 is shared, and on the night, the left vertical side of the dollar-sign box is also the terminating bar shown in FIG. 7.

One skilled in the art can appreciate that many variations on the above symbology design can be made, without departing from the spirit of the current invention.

A different Interface Graphic, such as one based on circles or other shapes, could be used as the starting point for the design. The Interface Graphic can be placed at either end of the bar code, or at any point within the bar code. A different character set for the data characters could be utilized, so long as the patterns used for data are chosen so as to eliminate matches with the selected start and stop patterns. For example, an (11,3) code could be used, but where the selected patterns all are such that the sum of the bars is odd, rather than even. In this case, the start and stop patterns of any of the preferred embodiments could still be used. A different (n,k) symbology, e.g., the (17,4) patterns of PDF417, could be used as the starting point.

A different pair of start and stop patterns could be used (such as the patterns of standard Code 128), so long as the combination of data characters and start/stop patterns chosen still maintain the property that the data characters cannot be misconstrued as start or stop patterns, even if scanned at an angle, or even if printing or scanning errors are introduced. In some cases, leading and/or trailing quiet zones might be required to ensure short-read prevention.

Figure 9:
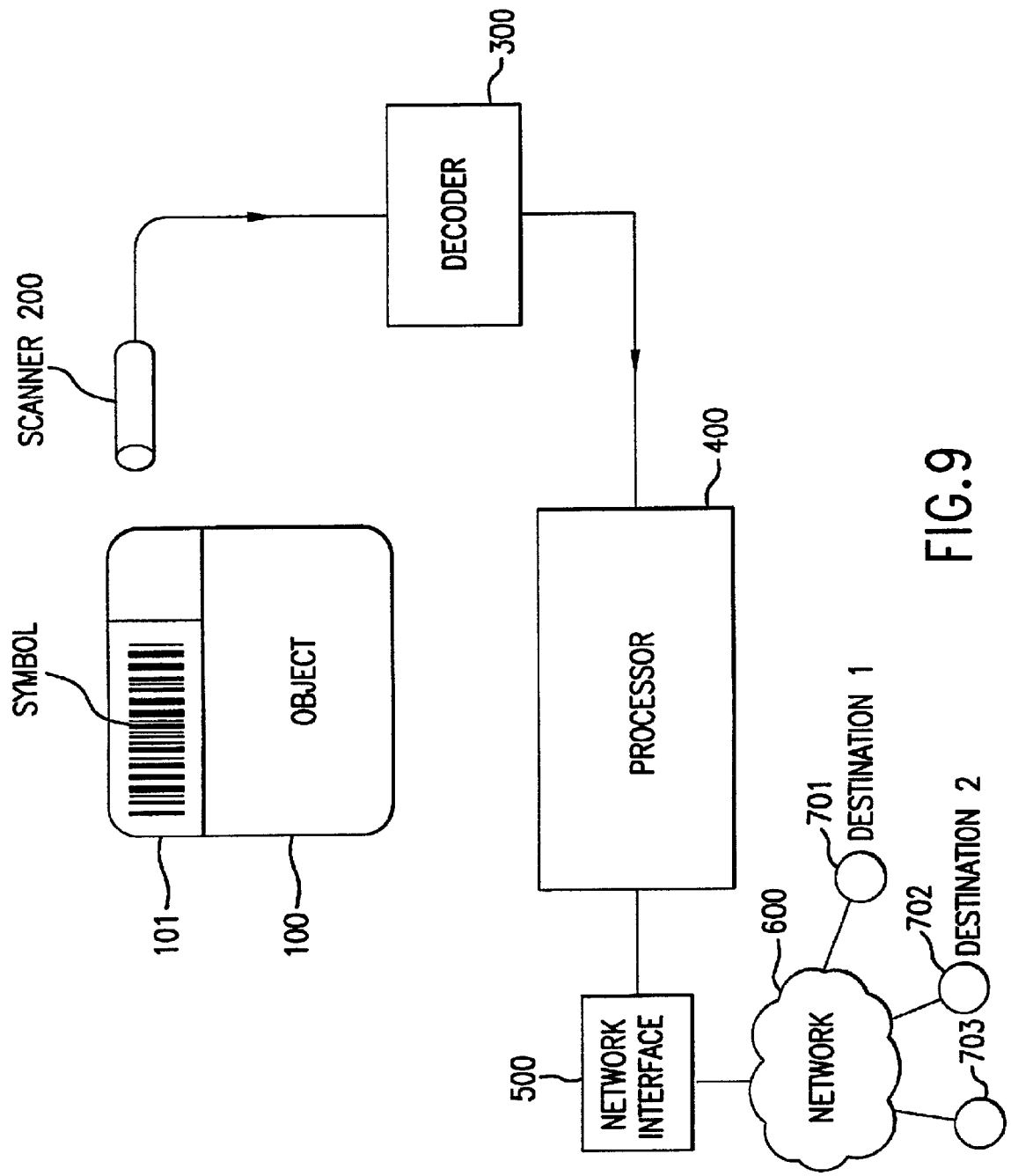
FIG. 9 shows an embodiment of the present invention in which the symbology is implemented on a carrier, and read by a scanner or reader.

Turning to FIG. 9, the symbology of the present invention may be implemented as a symbol 101 on a carrier 100. The symbol is read by a reader 200, and the data is decoded in a decoder 300. A processor 400 may provide user interfaces and applications, which is then connected to a network interface 500 to transfer the data to a communications network 600 to various destinations 701, 702, 703.

Figure 10:
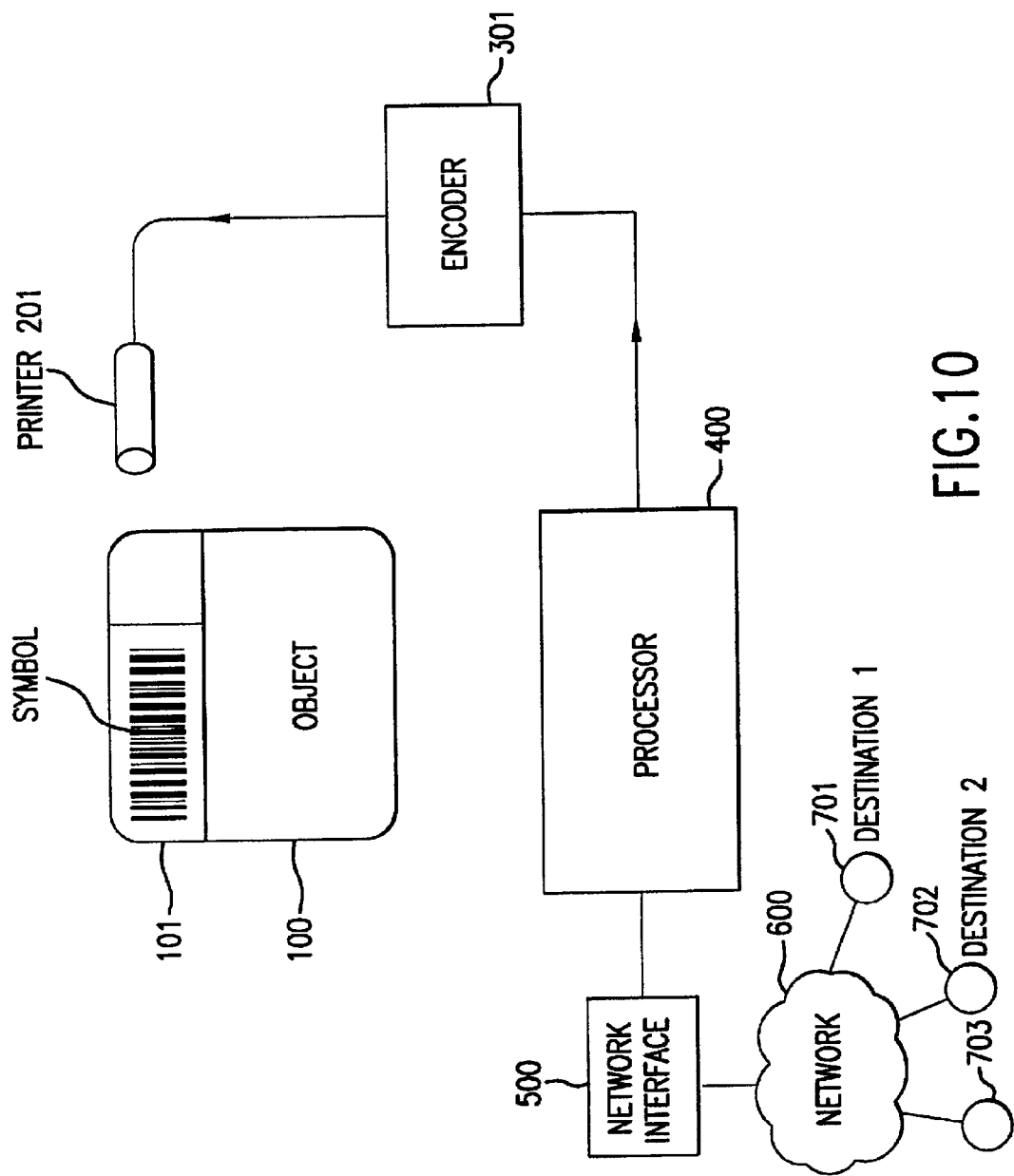
FIG. 10 shows an embodiment of the present invention in which the symbology is printed on a carrier.

Turning to FIG. 10, the symbology of the present invention may be printed as a symbol 101 on a carrier 100 by a printer 201. The data is encoded from an encoder 301. The encoder 301 may be connected to a processor 400 which provides user interfaces and applications and is also connected to a network interface 500 to allow the data to be encoded to be received from a communications network 600 and various sources 701, 702, 703 on the network.

Although the present invention has been described with respect to bar codes, and apparatus for reading and reproducing such bar code symbols on media, it is not limited to such embodiments. It is conceivable that the method of the present invention may also find applications for use with various machine vision or optical character recognition applications in which information is derived from other types of indicia such as characters or from the surface characteristics of the article being scanned.

In all the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and elements such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition systems.

An individual module may have specific scanning or decoding characters associated with it, e.g., operability at a certain working distance, or operability with a specific symbology or printing destiny. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The following claims are intended to encompass all such uses, implementations, and embodiments.

What is claimed is:

1. A bar code symbology, comprising: a set of symbols including characters having patterns of bars and spaces, each character spanning a distance of m module widths and being represented by n bars and p interleaved spaces, the largest single bar or space being limited to k modules in width, each symbol having a human recognizable graphic element provided among, and visually distinguished in appearance from, the patterns of bars and spaces, at least a portion of the graphic element being machine readable and recognizable by a decoder as a portion of a respective symbol, the graphic element having an arrowhead shape pointing in a scan direction lengthwise of the respective symbol and constituting a graphical user interface that graphically conveys to a human operator a visual message that a known action will be initiated upon reading of the respective symbol.

2. The symbology as defined in claim 1, wherein the graphic element is a fixed width pattern of bars and spaces, with bars of different height.

3. The symbology as defined in claim 1, wherein the graphic element uses fixed ratios of bar/space combinations.

4. The symbology as defined in claim 1, wherein the graphic element includes an area of white space used by a decode algorithm.

5. The symbology as defined in claim 4, wherein the area of white space has a fixed width.

6. The symbology as defined in claim 4, further comprising a predetermined start pattern and a predetermined stop pattern.

7. The symbology as defined in claim 6, wherein the symbology excludes from valid patterns a pair of patterns that Code 128 uses as a stop pattern.

8. The symbology as defined in claim 7, wherein the symbology excludes from valid patterns three Code 128 start patterns except for check characters adjacent the predetermined stop pattern.

9. The symbology as defined in claim 1, wherein n is equal to p.

10. The symbology as defined in claim 9, wherein the largest single bar or space pattern is limited to four modules in width.

11. The symbology as defined in claim 10, wherein n is equal to three, and each character spans a distance of 11 modules.

12. An information-bearing machine-readable carrier, comprising:
a substrate; and a symbol having characters and patterns of bars and spaces on the substrate, each character spanning a distance of m module widths and being represented by n bars and p interleaved spaces, the largest single bar or space in a character being limited to k modules in width, the symbol having a predetermined start pattern and a human recognizable graphic element provided among, and visually distinguished in appearance from, the patterns of bars and spaces, at least a portion of the graphic element being machine readable and recognizable by a decoder as a portion of a respective symbol, the graphic element having an arrowhead shape pointing in a scan direction lengthwise of the respective symbol and constituting a graphical user interface that graphically conveys to a human operator a visual message that a known action will be initiated upon reading of the respective symbol.

13. An apparatus, comprising:

an imager for obtaining image data of a target in an image field, the target including a symbol having characters and patterns of bars and spaces, each character spanning a distance of m module widths and being represented by n bars and p interleaved spaces, the largest single bar or space in a character being limited to k modules in width, the symbol having a predetermined start pattern, a predetermined stop pattern, and a human recognizable graphic element having an arrowhead share pointing in a scan direction lengthwise of the symbol and provided among the patterns of bars and spaces, at least a portion of the graphic element being machine readable; and a decoder for recognizing the portion of the graphic element as a portion of the symbol, and for processing the image data to derive information contained in the symbol, the graphic element constituting a graphical user interface that graphically conveys to a human operator a visual message that a known action will be initiated upon reading of the respective symbol.

14. An apparatus for generating a signal representative of information encoded in a machine-readable symbol, the apparatus comprising:

a) a scanner for scanning a single row of encoded characters of the symbol with light for reflection therefrom, each character representing an item of data and being selected from a set of detectable mark/space patterns, each character spanning a distance of m module widths and being represented by n bars and p interleaved spaces, the largest single bar or space in each character being limited to k modules in width, the symbol having a human recognizable graphic element having an arrowhead shape pointing in a scan direction lengthwise of the symbol and provided among, and visually distinguished in appearance from, the patterns of bars and spaces, at least a portion of the graphic element being machine readable;

b) a detector for detecting at least a portion of light reflected from the symbol, and for generating an electrical signal indicative of the detected light; and c) a decoder for recognizing from the electrical signal the portion of the graphic element as a portion of the symbol, and for decoding the electrical signal to obtain a plurality of corresponding data values representative of the information contained in the symbol, the graphic element constituting a graphical user interface that graphically conveys to a human operator a visual message that a known action will be initiated upon reading of the respective symbol.

15. A method of decoding a bar code symbology that stores computer-executable instructions on a computer-readable medium, comprising the steps of:

acquiring data from an electro-optical scan of a bar code symbol having said symbology by scanning a single row of encoded characters of the symbol with light for reflection therefrom, each character representing an item of data and being selected from a set of detectable mark/space patterns, each character spanning a distance of m module widths and being represented by n bars and p interleaved spaces, the largest single bar or space in each character being limited to k modules in width, the symbol having a human recognizable graphic element having an arrowhead shape pointing in a scan direction lengthwise of the symbol and provided among, and visually distinguished in appearance from, the patterns of bars and spaces, at least a portion of the graphic element being machine readable; and decoding the scanned characters according to a symbology definition by recognizing the portion of the graphic element as a portion of the symbol, the graphic element constituting a graphical user interface that graphically conveys to a human operator a visual message that a known action will be initiated upon reading of the respective symbol.

16. An apparatus, comprising:

means for producing a representation of a symbol having characters formed from patterns of bars and spaces, each character spanning a distance of m module widths and being represented by n bars and p interleaved spaces, the largest single bar or space in each character being limited to k modules in width, the symbol having a predetermined start pattern, a predetermined stop pattern, and a human recognizable graphic element having an arrowhead shape pointing in a scan direction lengthwise of the symbol and provided among, and visually distinguished in appearance from, the patterns of bars and spaces, at least a portion of the graphic element being machine readable and recognizable by a decoder as a portion of the symbol, the graphic element constituting a graphical user interface that graphically conveys to a human operator a visual message that a known action will be initiated upon reading of the respective symbol; and means for printing the representation on a substrate.

* * * * *